US008909575B2

(12) United States Patent
Hunzinger et al.

(10) Patent No.: US 8,909,575 B2
(45) Date of Patent: Dec. 9, 2014

(54) METHOD AND APPARATUS FOR MODELING NEURAL RESOURCE BASED SYNAPTIC PLACTICITY

(75) Inventors: Jason Frank Hunzinger, Escondido, CA (US); Jeffrey A. Levin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 13/408,134

(22) Filed: Feb. 29, 2012

(65) Prior Publication Data

US 2013/0226851 A1 Aug. 29, 2013

(51) Int. Cl.
*G06F 15/18* (2006.01)
*G06N 3/08* (2006.01)

(52) U.S. Cl.
USPC .......................................................... 706/25

(58) Field of Classification Search
CPC combination set(s) only.
See application file for complete search history.

(56) References Cited

U.S. PATENT DOCUMENTS

| 5,459,817 | A  | 10/1995 | Shima |
| 5,666,079 | A  | 9/1997  | Ma |
| 6,505,182 | B1 | 1/2003  | Van Den Heuvel |
| 6,581,046 | B1 | 6/2003  | Ahissar |
| 7,174,325 | B1 | 2/2007  | Ascoli |
| 7,287,014 | B2 | 10/2007 | Chen et al. |
| 7,412,428 | B2 | 8/2008  | Nugent |
| 7,430,546 | B1 | 9/2008  | Suri |
| 7,512,271 | B2 | 3/2009  | Matsugu et al. |
| 7,904,398 | B1 | 3/2011  | Repici |
| 8,433,665 | B2 * | 4/2013 | Tang et al. ........................ 706/33 |
| 8,606,732 | B2 * | 12/2013 | Venkatraman et al. .......... 706/27 |
| 8,625,337 | B2 * | 1/2014 | Wu et al. ........................ 365/158 |
| 8,694,452 | B2 * | 4/2014 | Aparin et al. .................... 706/38 |
| 8,706,662 | B2 * | 4/2014 | Chan et al. ...................... 706/15 |
| 8,756,173 | B2 * | 6/2014 | Hunzinger et al. ............. 706/12 |
| 2004/0097562 | A1 | 5/2004 | Olesen et al. |
| 2008/0208783 | A1 | 8/2008 | Jaros et al. |
| 2009/0287624 | A1 | 11/2009 | Rouat et al. |
| 2009/0313195 | A1 | 12/2009 | McDaid et al. |
| 2010/0076916 | A1 | 3/2010 | Van Der Made et al. |
| 2010/0145402 | A1 | 6/2010 | Rom |
| 2010/0185250 | A1 | 7/2010 | Rom |

(Continued)

FOREIGN PATENT DOCUMENTS

| JP | 7084978 A | 3/1995 |
| TW | 242981 | 3/1995 |
| WO | 9318474 A1 | 9/1993 |
| WO | 9729437 A1 | 8/1997 |

OTHER PUBLICATIONS

Clopath, et al.,. "Predicting Neuronal Activity with Simple Models of the Threshold Type; Adaptive Exponential Integrate-and-Fire Model with Two Compartments," Preprint submitted to Elsevier Science, Aug. 29, 2006, 6 pgs.

(Continued)

*Primary Examiner* — Michael B Holmes
(74) *Attorney, Agent, or Firm* — Rupit M. Patel

(57) ABSTRACT

Certain aspects of the present disclosure support a method of designing the resource model in hardware (or software) for learning spiking neural networks. The present disclosure comprises accounting for resources in a different domain (e.g., negative log lack-of-resources instead of availability of resources), modulating weight changes for multiple spike events upon a single trigger, and strategically advancing or retarding the resource replenishment or decay (respectively) to overcome the limitation of single event-based triggering.

36 Claims, 9 Drawing Sheets

(56) References Cited

U.S. PATENT DOCUMENTS

| | | |
|---|---|---|
| 2010/0220523 A1 | 9/2010 | Modha et al. |
| 2010/0235310 A1 | 9/2010 | Gage et al. |
| 2010/0299296 A1 | 11/2010 | Modha et al. |
| 2010/0299297 A1 | 11/2010 | Breitwisch et al. |
| 2011/0137843 A1 | 6/2011 | Poon et al. |
| 2011/0153533 A1 | 6/2011 | Jackson et al. |
| 2012/0011089 A1 | 1/2012 | Aparin et al. |
| 2012/0084241 A1 | 4/2012 | Friedman et al. |
| 2012/0109864 A1 | 5/2012 | Modha |
| 2012/0150781 A1 | 6/2012 | Arthur et al. |
| 2013/0024409 A1 | 1/2013 | Hunzinger et al. |
| 2013/0046716 A1 | 2/2013 | Chan et al. |
| 2013/0073491 A1 | 3/2013 | Izhikevich et al. |
| 2013/0073501 A1 | 3/2013 | Hunzinger et al. |
| 2013/0103626 A1 | 4/2013 | Hunzinger |
| 2013/0339280 A1 | 12/2013 | Hunzinger et al. |

OTHER PUBLICATIONS

Dan et al., Spike timing-dependent review plasticity of neural circuits, Neuron, Sep. 2004, pp. 23-30, vol. 44.

Froemke, et al. "Spike-timing-dependent synaptic modification induced by natural spike trains," Division of Neurobiology, Department of Molecular and Cell Biology, UC Berkeley, Nature, letters to nature, vol. 416, Mar. 2002, 6 pgs.

Froemke, et al.,. "Temporal modulation of spike-timing-dependent plasticity," Frontiers in Synaptic Neuroscience, vol. 2, Article 19, Jun. 2010, 16 pgs.

Huerta, et al., "Bidirectional Synaptic Plasticity Induced by a Single Burst during Cholinergic Theta Oscillation in CA1 In Vitro," Neuron vol. 15, 1995, pp. 1053-1063.

Kubota et al., "Modulation of LTP/LTD balance in STDP by an activity-dependent feedback mechanism," Neural Network, vol. 22, 2009, pp. 527-535.

Eurich C W.,et al. "Dynamic of Self-Organized Delay Adaptation", Physical Review Letters, vol. 82, No. 7, Feb. 1999, pp. 1594-1597.

Gilson M., et al., "Emergence of Network Structure Due to Spike-Timing-Dependent Plasticity in Recurrent Neuronal Networks. I. Input Selectivity-Strengthening Correlated Input Pathways", Biological Cybernetics, Jun. 2009, pp. 81-102.

Brette et al.,"Simulation of networks of spiking neurons: A review of tools and strategies," Springer, Journal of Computational Neuroscience, vol. 23, pp. 349-398, 2007.

Hunzinger, J.V., et al., "Learning complex temporal patterns with resource-dependent spike timing-dependent plasticity", Journal of Neurophysiology, vol. 108, No. 2, Jul. 15, 2012, pp. 551-566, XP055069720, ISSN: 0022-3077, DOI:10.1152/jn.01150.2011 the whole document.

International Search Report and Written Opinion—PCT/US2013/028405—ISA/EPO—Jul. 16, 2013.

Nageswaran, J.M., et al., "A configurable simulation environment for the efficient simulation of large-scale spiking neural networks on graphics processors", Neural Networks, Elsevier Science Publishers, Barking, GB, vol. 22, No. 5-6, Jul. 1, 2009, pp. 791-800, XP026446158.

Park, H.O., et al., "Discrete Synapse Recurrent Neural Network for nonlinear system modeling and its application on seismic signal classification", Neural Networks (IJCNN), The 2010 International Joint Conference on, IEEE, Piscataway, NJ, USA, Jul. 18, 2010, pp. 1-7, XP031771705.

Schaik, A.V., et al., "A log-domain implementation of the Izhikevich neuron model", IEEE International Symposium on Circuits and Systems. ISCAS 2010—May 30-Jun. 2, 2010—Paris, France, IEEE, US, May 30, 2010, pp. 4253-4256, XP031724796, ISBN: 978-1-4244-5308-5 the whole document.

Amemori, K.I., et al., "Self-organization of delay lines by spike-time-dependent learning", Neurocomputing, Elsevier Science Publishers, Amsterdam, NL, vol. 61, Oct. 1, 2004, pp. 291-316, XP004568343, ISSN: 0925-2312, DOI: 10.1016/J.NEUCOM.2003.09.013 p. 291-p. 315.

Arena, P., et al., "STDP with adaptive synaptic delay for robot navigation control", Proceedings of SPIE, vol. 6592, May 18, 2007, XP055049378, ISSN: 0277-786X, DOI: 10.1117/12.724204 pp. 65920J-1-pp. 65920J-9, paragraph 3.

Babadi, B., et al., "Intrinsic Stability of Temporally Shifted Spike-Timing Dependent Plasticity", PLOS Computational Biology, vol. 6, No. 11, Jan. 1, 2010, pp. e1000961-e1000961, XP55040430, ISSN: 1553-734X, DOI: 10.1371/journal.pcbi.1000961 p. 1-p. 13, right-hand column, paragraph 4.

Bako L., et al., "Hardware Implementation of Delay-Coded Spiking-RBF Neural Network for Unsupervised Clustering," in 11th International Conference on Optimization of Electrical and Electronic Equipment (OPTIM), 2008, pp. 51-56.

Bofill-I-Petit, A., et al., "Synchrony Detection and Amplification by Silicon Neurons With STDP Synapses", IEEE Transactions on Neural Networks, Service Center, Piscataway, NJ, US, vol. 15, No. 5, Sep. 1, 2004, pp. 1296-1304, XP011118617, ISSN: 1045-9227, DOI: 10.1109/TNN.2004.832842 p. 1296-p. 1303, right-hand column, paragraph 2.

Bohte S.M., et al., "Unsupervised Clustering with Spiking Neurons by Sparse Temporal Coding and Multilayer RBF Networks," in IEEE Transactions on Neural Networks, 2002, vol. 13(2), pp. 426-435.

Bothe, S.M., et al., "Reducing Spike Train Variability: A Computational Theory of Spike-Timing Dependent Plasticity", Advances in Neural Information Processing Systems (NIPS) 17, Jan. 1, 2005, pp. 201-208, XP055052246, Cambridge, MA [retrieved on Feb. 4, 2013].

Cameron, K., et al., "Spike Timing Dependent Adaptation for Mismatch Compensation", 2006 IEEE International Symposium on Circuits and Systems May 21-24, 2006 Island of Kos, Greece, IEEE—Piscataway, NJ,USA,May 21, 2006, XP010938590, DOI: 10.1109/ISCAS.2006.1692812 ISBN: 978-0-7803-9389-9, pp. 1223-1226.

Caporale, N., et al., "Spike Timing-Dependent Plasticity: A Hebbian Learning Rule", Annual Review of Neuroscience, vol. 31, No. 1, Jul. 1, 2008, pp. 25-46, XP055052234, ISSN: 0147-006X, DOI: 10.1146/annurev.neuro.31.06G407.125639 abstract; figure 1 p. 31, left-hand column, paragraph 2—p. 36, left-hand column, paragraph 1.

Duro, et al., "Discrete-Time Backpropagation for Training Synaptic Delay-Based Artificial Neural Networks," IEEE Transactions on Neural Networks, vol. 10, No. 4, Jul. 1999, pp. 779-789.

Gilson, M., et al., "Stability versus Neuronal Specialization for STDP: Long-Tail Weight Distributions Solve the Dilemma", PL0S One, vol. 6, No. 10, Jan. 1, 2011, p. e25339, XP055052242, ISSN: 1932-6203, DOI: 10.1371/journal.pone.0025339.

Johnston, S.P., et al., "A Hybrid Learning Algorithm Fusing STDP with GA based Explicit Delay Learning for Spiking Neurons", Intelligent Systems, 2006 3rd International IEEE Conference on, IEEE, PI, Sep. 1, 2006, XP031078858, DOI: 10.1109/IS.2006.348493ISBN: 978-1-4244-0195-6, pp. 632-637.

Maass, W. et al, "On the complexity of learning for spiking neurons with temporal coding", 1999.

Murakoshi, K. et al., "Firing Time of Neuron by Interference Between Synaptic Inputs," in International Conference on Systems, Man, and Cybernetics (SMC), 1999, pp. 377-382.

Natschlager, T. et al., "Spatial and temporal pattern analysis via spiking neurons", in Institute for Theoretical Computer Science, Technische Universitat Gratz, Austria, pp. 9(3): 319-32, 1998.

Paugam-Moisy, H., et al., "A supervised learning approach based on STDP and polychronization in spiking neuron networks", ESANN'2007 proceedings—European Symposium on Artificial Neural Networks, Apr. 1, 2007, pp. 25-27, XP055049375, Bruges, Belgium ISBN: 2930307072Retrieved from the Internet:URL:http://www.elen.ucl.ac.be/Proceedings/esann/esannpdf/es2007-95.pdf [retrieved on Jan. 11, 2013] p. 427-p. 432, line 4.

Ruf, B. et al, "Hebbian learning in networks of spiking neurons using temporal coding", in Biological and artificial computation: From neuroscience to technology, pp. 380-389, 1997.

Schemmel J. et al., "Implementing Synaptic Plasticity in a VLSI Spiking Neural Network Model", International Joint Conference on Neural Networks, 2006. IJCNN '06, Piscataway, NJ: IEEE Operations Center, Piscataway, NJ, USA, Jan. 1, 2006, pp. 1-6, XP002557202, ISBN: 978-0-7803-9490-2 Retrieved from the

(56) References Cited

OTHER PUBLICATIONS

Internet URL:http://www.kip.uni-heidelberg.de/Veroeffentiichungen/download.cgi/4620/ps/1774.pdf [retrieved on Nov. 23, 2009].

Senn, et al., "An Algorithm for Synaptic Modification Based on Exact Timing of Pre- and Post-Synaptic Action Potentiais," in Proceedings: ICANN, 1997, 6 pgs.

Standage, D., et al., "The Trouble with Weight-Dependent STDP", Neural Networks, 2007. IJCNN 2GG7. International Joint Conference on, IEEE, Piscataway, NJ, USA, Aug. 1, 2007, pp. 1348-1353, XP031154790, ISBN: 978-1-4244-1379-9.

Tanaka, H., et al., "A CMOS Spiking Neural Network Circuit with Symmetric/Asymmetric STDP Function", IEICE Transactions on Fundamentals of Electronics,Communications and Computer Sciences, Engineering Sciences Society, Tokyo, JP, vol. E92A, No. 7, Jul. 1, 2009, pp. 1690-1698, XP001547503, ISSN: 0916-8508, DOI: 10.1587/TRANSFUN.E92.A.1690 p. 1690-p. 1696, right-hand column.

Bishop W.B., "Estimating the posterior probability of LTP failure by sequential Bayesian analysis of an imperfect Bernoulli trial model," IEEE Transactions on Biomedical Engineering, vol. 48, No. 6, Jun. 2001, pp. 670-683, XP011007084, D0I: 10.1109/10.923785 Section III.A.1.

Friedrich J., et al., "Dynamics of recurrent neural networks with delayed unreliable synapses: metastable clustering," Journal of Computational Neuroscience, vol. 27, No. 1, Dec. 10, 2008, pp. 65-80, XP019730519, D0I:10.1007/S10827-008-0127-1 Section 2.

Lubenov E.B., et al., "Decoupling through synchrony in neuronal circuits with propagation delays", Neuron, vol. 58, No. 1, Apr. 9, 2008, pp. 118-131, XP055101258, D0I:10.1016/j.neuron.2008.01.036 Experimental procedures.

Morrison A., et al., "Phenomenological models of synaptic plasticity based on spike timing," Biological Cybernetics, vol. 98, No. 6, Apr. 9, 2008, pp. 459-478, XP019630139, D0I: 10.1007/500422-008-0233-1 Section 4.1.3.

* cited by examiner

| Method  e: e^x  p: x^c | Synaptic Plasticity | Resource Recovery | Resource Commitment |
|---|---|---|---|
| I. Resource | 1e | 1e | 1p |
| II. 1-Resource | 1e | 1e | 1p |
| III. Log Resource | 1e | 2e | ~1p, 0/1e |
| IV. Log 1-Resource | 2e | 0 | ~0 |

METHOD AND APPARATUS FOR MODELING NEURAL RESOURCE BASED SYNAPTIC PLACTICITY

BACKGROUND

1. Field

Certain aspects of the present disclosure generally relate to neural system engineering and, more particularly, to a method and apparatus for modeling neural resource-based synaptic plasticity.

2. Background

The resource model represents a model of synaptic plasticity (neural learning) that accurately accounts for biological experimental data and allows fast, stable and diverse learning of temporal patterns in biologically consistent spiking neural networks. Thus, there is a substantial motivation to use the resource model in hardware-based or hardware-accelerated neural network simulations. It is also desirable to limit (in hardware) the frequency and amount of information being conveyed among modules or units for parallelization. The problem is how to efficiently design the resource model of synaptic plasticity.

SUMMARY

Certain aspects of the present disclosure provide a method of learning in a spiking neural network. The method generally includes modeling resources associated with synapses of the spiking neural network using a defined domain, modulating changes of a weight associated with one of the synapses for multiple spike events upon a single trigger related to that synapse, and updating, in the defined domain, one of the resources associated with that synapse based on the multiple spike events upon the single trigger.

Certain aspects of the present disclosure provide an apparatus for neural learning in a spiking neural network. The apparatus generally includes a first circuit configured to model resources associated with synapses of the spiking neural network using a defined domain, a second circuit configured to modulate changes of a weight associated with one of the synapses for multiple spike events upon a single trigger related to that synapse, a third circuit configured to update, in the defined domain, one of the resources associated with that synapse based on the multiple spike events upon the single trigger, a fourth circuit configured to save a state of that one resource in the defined domain after performing both the LTD change of weight and the LTP change of weight, and a fifth circuit configured to project that one resource back in time to a replay time of a pre-synaptic spike of the multiple spike events.

Certain aspects of the present disclosure provide an apparatus for neural learning in a spiking neural network. The apparatus generally includes means for modeling resources associated with synapses of the spiking neural network using a defined domain, means for modulating changes of a weight associated with one of the synapses for multiple spike events upon a single trigger related to that synapse, and means for updating, in the defined domain, one of the resources associated with that synapse based on the multiple spike events upon the single trigger.

Certain aspects of the present disclosure provide a computer program product for neural learning in a spiking neural network. The computer program product generally includes a computer-readable medium comprising code for modeling resources associated with synapses of the spiking neural network using a defined domain, modulating changes of a weight associated with one of the synapses for multiple spike events upon a single trigger related to that synapse, and updating, in the defined domain, one of the resources associated with that synapse based on the multiple spike events upon the single trigger.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
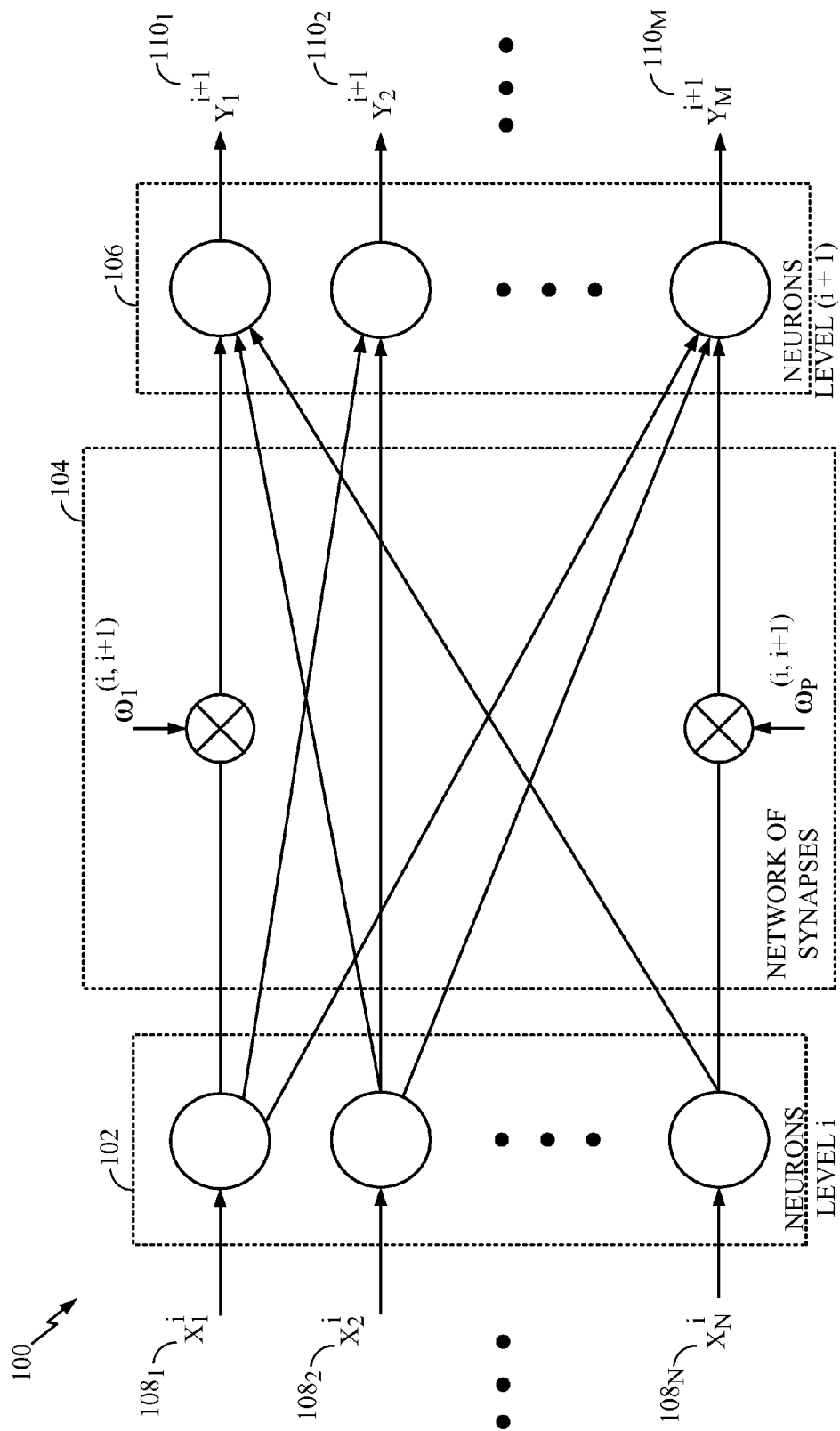
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104), and scale those signals according to adjustable synaptic weights $w_1^{(i,i+1)}, \ldots, w_P^{(i,i+1)}$ (where P is a total number of synaptic connections between the neurons of levels 102 and 106). Further, the scaled signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Learning in spiking neural networks, such as the neural network 100 from FIG. 1, may typically employ a spike-timing-dependent plasticity (STDP) rule based on biologically observed data. Such typical learning may adapt weights of synapses (e.g., the weights of synapses 104 from FIG. 1) based on a time difference between the pre-synaptic neuron input spike and the post-synaptic neuron spike. However, more natural spike trains (e.g., occurring in biology or engineering networks) may comprise multiple spikes (both pre-synaptic and post-synaptic).

Certain aspects of the present disclosure support a method of designing the resource model in hardware (or software) for learning in spiking neural networks (e.g., in the neural network 100 from FIG. 1). Particularly in hardware, there is a motivation to combine learning into a single rule executed upon replay of spikes. This differs from standard application of pair-wise synaptic plasticity rules where long-term potentiation (LTP) and long-term depression (LTD) of a synaptic strength are triggered on separate rule events, since now LTP and LTD may be determined from a single trigger (event). The present disclosure comprises (i) accounting for resources in a different domain (e.g., negative log lack-of-resources instead of availability of resources), (ii) modulating weight changes for multiple spike events upon a single trigger, and (iii) strategically advancing or retarding the resource replenishment or decay (respectively) to overcome the limitation of single event-based triggering.

The method described in the present disclosure provides several technical advantages, such as (i) biologically accurate synaptic plasticity, (ii) fast, stable and diverse temporal pattern learning, with (iii) fast, efficient and minimal hardware circuit design. Further advantages and details will become apparent upon further description of the present disclosure.

Elements of the synaptic plasticity and the resource rule (recovery and depletion) are first described in the present disclosure. Several alternatives are derived and described mathematically, along with strategically useful approximations. Following this, several alternatives on how the elements may fit together in a combined pre-synaptic replay are described in the present disclosure. According to certain aspects, any of the alternative element compositions may be used in combination with any of the rule alternatives. However, there may exist a preferred combination referred to as the preferred aspect of the present disclosure.

Models of Synaptic Resources

In the present disclosure, four demonstrative domains are derived in which to account for synaptic resources. The first domain is the most basic, and it accounts for available resources. However, this domain has some (relative) disadvantages for accounting in hardware because of computation as well as precision. Thus, several alternatives are presented including log domain accounting and tracking lack-of-resources instead of availability of resources. According to certain aspects, it may be also convenient to track the negative of the aforementioned quantities.

Variables used throughout the present disclosure are: synaptic weight w(t) at time t; LTP/LTD (+/−) spike-timing-dependent plasticity (STDP) curve magnitudes $A_+$, $A_-$; LTP/LTD (+/−) STDP curve time constants $\tau_+$, $\tau_-$; pre-post or post-pre (+/−) timing difference $\Delta t_+$, $\Delta t_-$; synaptic resource r(t) at time t; resource model time constant $\tau_r$; time since last resource commitment T; and resource model $f$ characterization $f(x)=(|x|/A)^\gamma$ (typically $A=A_+$, $\gamma=1$ or $\frac{1}{2}$).

According to certain aspects of the present disclosure, the resource model may comprise three aspects: (1) how available resources modulate weight changes; (2) how resources recover as determined by the time constant $\tau_r$; and (3) how weight changes modulate the amount of resources available. Regarding the latter, the resource model characterization function $f(x)$ may determine how much resources are depleted for a given weight change x. For example, if $A=A_+$ and $\gamma=1$, then $f(x)=|x|/A$, where |x| is the amount of weight change (magnitude). In the case of full (un-restricted) LTP, $x=A_+$, $f(x)=1$ and thus all resources will be depleted as a result of committing to this LTP operation. It should be noted that if the exponent $\gamma$ is smaller than one, then proportionally more resources might be used up with smaller weight changes. In other words, by setting the exponent less than one, it is possible to model the concept that substantial resources are required even to make small weight changes: large weight changes are more efficient, and small weight changes are less efficient.

Resource Availability

Certain aspects of the present disclosure may support the standard resource model. The resource modulated synaptic plasticity (+LTP, −LTD) may be given as:

$$w(t+\varepsilon) = w(t) + \Delta w, \tag{1}$$

$$\Delta w_{+/-} = r\left[A_{+/-} e^{-\frac{\Delta t_{+/-}}{\tau_{+/-}}}\right]. \tag{2}$$

The resource recovery may be defined as:

$$r(t+T) = 1 - (1 - r(t))e^{-\frac{T}{\tau_r}}, \tag{3}$$

and the resource commitment may be given as:

$$r(t+\varepsilon) = r(t) - \left(\frac{|\Delta w_{+/-}|}{A}\right)^\gamma, \tag{4}$$

$$r(t+\varepsilon) = r(t) - (r(t))^\gamma \left(\frac{A_{+/-}}{A}\right)^\gamma e^{-\gamma\frac{\Delta t_{+/-}}{\tau_{+/-}}}. \tag{5}$$

Lack of Resource

According to certain aspects of the present disclosure, a potentially more efficient equivalent computation is supported by accounting for the lack of resources instead of the presence of resources. In an aspect, the lack of resource may be defined as:

$$r=(1-r'). \tag{6}$$

The resource modulated synaptic plasticity (+LTP, −LTD) may be given as:

$$\Delta w_{+/-} = (1-r')\left[A_{+/-} e^{-\frac{\Delta t_{+/-}}{\tau_{+/-}}}\right]. \tag{7}$$

The resource recovery may be defined as:

$$r'(t+T) = r'(t)e^{-\frac{T}{\tau_r}}, \tag{8}$$

and the resource commitment may be defined as:

$$r'(t+\varepsilon) = r'(t) + \left(\frac{|\Delta w_{+/-}|}{A}\right)^\gamma, \tag{9}$$

$$r'(t+\varepsilon) = r'(t) + (r'(t))^\gamma \left(\frac{A_{+/-}}{A}\right)^\gamma e^{-\gamma\frac{\Delta t_{+/-}}{\tau_{+/-}}}. \tag{10}$$

Log Resource

Certain aspects of the present disclosure may support a potentially more efficient computation by accounting for the log resources. In an aspect, the log resource may be defined as:

$$\hat{r}=\log(r), \tag{11}$$

$$r=e^{\hat{r}}. \tag{12}$$

The resource modulated synaptic plasticity (+LTP, −LTD) may be defined as:

$$\Delta w_{+/-} = A_{+/-} e^{\hat{r} - \left(\frac{\Delta t_{+/-}}{\tau_{+/-}}\right)}. \tag{13}$$

The resource recovery may be given as:

$$\hat{r}(t+T) = \log\left(1 - \left(1 - e^{\hat{r}(t)}\right)e^{-\frac{T}{\tau_r}}\right). \tag{14}$$

It can be observed that equation (14) is of the form:

$$\log(1-(1-e^X)e^{aY}). \tag{15}$$

Utilizing Taylor series and first term approximation, domain approximation can be written as:

$$\log(1-x) = -\sum_{n=1}^{\infty} \frac{x^n}{n} \cong -x, \tag{16}$$

$$\hat{r}(t+T) \cong \left(1 - e^{\hat{r}(t)}\right)e^{-\frac{T}{\tau_r}}. \tag{17}$$

It can be observed that equation (17) is of the form:

$$(1-e^X)e^{aY}. \tag{18}$$

The resource commitment may be computed based on:

$$\left(\frac{|\Delta w_{+/-}|}{A}\right)^{\gamma} = \left(\frac{A_{+/-}}{A}\right)^{\gamma} e^{\gamma\left[\hat{r} - \left(\frac{\Delta t_{+/-}}{\tau_{+/-}}\right)\right]}. \quad (19)$$

Using weight change, the resource commitment may be obtained as:

$$\hat{r}(t+\varepsilon) = \log\left[e^{\hat{r}(t)} - \left(\frac{|\Delta w_{+/-}|}{A}\right)^{\gamma}\right]. \quad (20)$$

Direct computation of the resource commitment may be given as, $$\hat{r}(t+\varepsilon) = \hat{r}(t) + \log\left[\left(1 - \left(\frac{A_{+/-}}{A}\right)^{\gamma} e^{(\gamma-1)\hat{r} - \gamma\left(\frac{\Delta t_{+/-}}{\tau_{+/-}}\right)}\right)\right]. \quad (21)$$

It can be observed that equation (21) is of the form:

$$\log(1 - ae^{bX - cY}). \quad (22)$$

Negative Log Lack of Resource

According to the preferred aspect of the present disclosure, the negative log lack of resources may be utilized providing a potentially more efficient equivalent computation. The negative log lack of resource may be defined as:

$$\hat{r} = -\log(1-r). \quad (23)$$

The resource modulated synaptic plasticity (+LTP, −LTD) may be given as:

$$\Delta w_{+/-} = (1 - e^{-\hat{r}})\left[A_{+/-} e^{-\frac{\Delta t_{+/-}}{\tau_{+/-}}}\right]. \quad (24)$$

For $\hat{r}(t) \to 0$, equation (24) may become:

$$\Delta w_{+/-} = \hat{r}\left[A_{+/-} e^{-\frac{\Delta t_{+/-}}{\tau_{+/-}}}\right]. \quad (25)$$

For $\hat{r}(t) \to \infty$, equation (24) may become:

$$\Delta w_{+/-} = \left[A_{+/-} e^{-\frac{\Delta t_{+/-}}{\tau_{+/-}}}\right]. \quad (26)$$

The resource recovery may be defined as:

$$\hat{r}(t+T) = \hat{r}(t) + \frac{T}{\tau_r}. \quad (27)$$

The resource commitment may be computed based on:

$$\left(\frac{|\Delta w_{+/-}|}{A}\right)^{\gamma} = (1 - e^{-\hat{r}})^{\gamma}\left(\frac{A_{+/-}}{A}\right)^{\gamma} e^{-\gamma\left(\frac{\Delta t_{+/-}}{\tau_{+/-}}\right)}. \quad (28)$$

Using weight change, the resource commitment may be obtained as:

$$\hat{r}(t+\varepsilon) = -\log\left[e^{-\hat{r}(t)} + \left(\frac{|\Delta w_{+/-}|}{A}\right)^{\gamma}\right]. \quad (29)$$

Direct computation of the resource commitment may be given as, $$\hat{r}(t+\varepsilon) = -\log\left[e^{-\hat{r}(t)} + (1 - e^{-\hat{r}(t)})^{\gamma}\left(\frac{A_{+/-}}{A}\right)^{\gamma} e^{-\gamma\left(\frac{\Delta t_{+/-}}{\tau_{+/-}}\right)}\right], \quad (30)$$

$$\hat{r}(t+\varepsilon) = \hat{r}(t) - \log\left[1 + e^{\hat{r}(t)}(1 - e^{-\hat{r}(t)})^{\gamma}\left(\frac{A_{+/-}}{A}\right)^{\gamma} e^{-\gamma\left(\frac{\Delta t_{+/-}}{\tau_{+/-}}\right)}\right], \quad (31)$$

or, $$\hat{r}(t+\varepsilon) = \gamma\left[\left(\frac{\Delta t_{+/-}}{\tau_{+/-}}\right) - \log\left(\frac{A_{+/-}}{A}\right)\right] + \log\left[\left(\frac{A_{+/-}}{A}\right)^{\gamma} e^{-\hat{r}(t) + \gamma\left(\frac{\Delta t_{+/-}}{\tau_{+/-}}\right)} + (1 - e^{-\hat{r}(t)})^{\gamma}\right]. \quad (32)$$

All of these forms may present some challenge because of the separation of the exponent terms of $\Delta t$ and $\hat{r}(t)$. However, some part-wise approximations can be considered. For example, for $\Delta t_{+/-} \gg \tau_{+/-}$, $$\hat{r}(t+\varepsilon) \approx \hat{r}(t). \quad (33)$$

For $x \approx 1$, $1 - e^{-x} \approx x/c$. For $\Delta t_{+/-} \ll \tau_{+/-}$, particularly if $\hat{r}(t) \to \infty$, $$\hat{r}(t+\varepsilon) \approx \gamma\left(\frac{\Delta t_{+/-}}{\tau_{+/-}}\right)(1 - e^{-\hat{r}(t)})^{\gamma}. \quad (33)$$

Heuristically, if $\hat{r}(t) \to 0$, $$\hat{r}(t+\varepsilon) \approx \gamma\left(\frac{\Delta t_{+/-}}{\tau_{+/-}}\right)\left(\frac{\hat{r}(t)^{\gamma}}{2}\right). \quad (34)$$

When $\hat{r}(t)$ is a mid-range value, $$\hat{r}(t+\varepsilon) \approx \left[\hat{r}(t) + \gamma\left(\frac{\Delta t_{+/-}}{\tau_{+/-}}\right)\left(\frac{\hat{r}(t)^{\gamma}}{2}\right)\right]/3, \quad (35)$$

or, $$\hat{r}(t+\varepsilon) \approx \left[\hat{r}(t) + \gamma\left(\frac{\Delta t_{+/-}}{\tau_{+/-}}\right)(1 - e^{-\hat{r}(t)})^{\gamma}\right]/3. \quad (36)$$

Thus, only computation of exponents $e^{-\hat{r}(t)}$ may be required in addition to LTP/LTD. However, this may be already required for the weight update and may not need to be recomputed.

Algorithmically, the resource commitment may be obtained as follows. First, the estimate may be initialized, $$\hat{r}(t+\varepsilon) := \gamma\left(\frac{\Delta t_{+/-}}{\tau_{+/-}}\right). \quad (37)$$

If $\hat{r}(t) > \theta_{\hat{r}}$, and if $\Delta t_{+/-} < \theta_{\Delta t}$, then $$\hat{r}(t+\epsilon) := \hat{r}(t+\epsilon)(1 - e^{-\hat{r}(t)})^{\gamma}. \quad (38)$$

Otherwise, $$\hat{r}(t+\epsilon) := \hat{r}(t+\epsilon)\hat{r}(t)^{\gamma}/2. \quad (39)$$

If $\Delta t_{+/-} > 2\theta_{\Delta t}$, $$\hat{r}(t+\epsilon) := \hat{r}(t). \quad (40)$$

Else if $\Delta t_{+/-} > \theta_{\Delta t}$, $$\hat{r}(t+\epsilon) := [\hat{r}(t+\epsilon) + \hat{r}(t)]/3. \quad (41)$$

For example, an approximation for parameters: $\gamma=1$, $\tau_+=20$, $A_+=A=1$, using $\theta_r=2$ and $\theta_{\Delta r}=2\tau_+$ may yield a mean error of 0.024 with a maximum error of approximately 0.125. An approximation for parameter $\gamma=\frac{1}{2}$ may yield a mean error of 0.060 with a maximum error of approximately 0.15.

Resource Model in Combined Pre-Synaptic Replay Rule

Typically, LTP and LTD are triggered and computed separately on post-synaptic or pre-synaptic spike events, respectively. It should be noted that weight changes might not actually occur then, merely that these may be the trigger points.

However, in hardware, it is desirable to handle both LTP and LTD in one rule, executed upon replay of a spike. In an aspect, this spike may be replayed for the post-synaptic neuron and may be thus a pre-synaptic spike from that neuron's perspective. In this rule, the nearest post-synaptic spikes may be found to either side of the pre-synaptic spike (called the pre-pre post spike and the post-pre post spike). According to certain aspects of the present disclosure, weight changes for LTD and LTP may be computed based on these spikes.

Two alternatives to the basic separate-LTP/LTD method are described in the present disclosure. The preferred aspect of the present disclosure is depicted in FIG. 2 illustrating an example 200 of combined pre-synaptic replay rule handling both LTP and LTD in accordance with certain aspects of the present disclosure.

The utilized resource method may need a time since the last (prior) pre-synaptic spike, which is effectively the time since the last execution of the rule for the synapse. This may be needed so that the resource recovery from that time until the current time can be computed and applied for a pre-post pairing LTP. The LTP may be modulated by the resource at that time and the resource may be depleted. The LTD can then be modulated by recovering the resource to the following post-synaptic spike and then depleting the resource. However, instead of storing the resource at that time for the next event, the resource may be decayed back to the current event time (effectively reversing the recovery that will occur in the next iteration).

Figure 2:
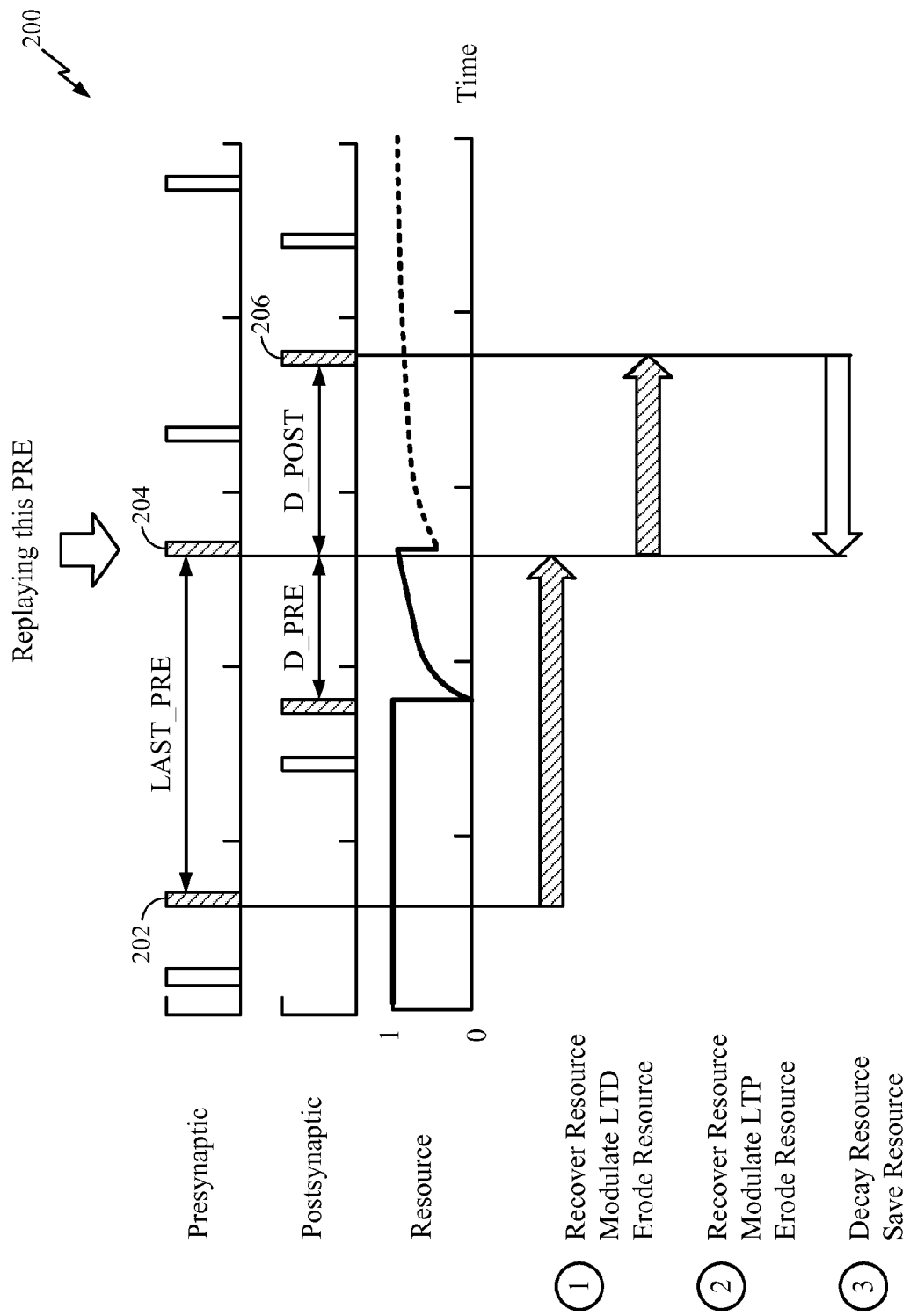
FIG. 2 illustrates an example of combined pre-synaptic replay rule handling both long-term potentiation (LTP) and long-term depression (LTD) in accordance with certain aspects of the present disclosure.

Referring to FIG. 2, in the first step (i.e., a last pre-synaptic spike 202→a pre-synaptic spike 204), the following sub-steps may occur: (1a) resource state update (recovery/decay), (1b) LTD weight change, and (1c) resource state update (commitment/depletion). In the second step (i.e., the pre-synaptic spike 204→a post-pre post-synaptic spike 206), the following sub-steps may occur: (2a) resource state update (recovery/decay), (2b) LTP weight change, and (2c) resource state update (commitment/depletion). In the third step (i.e., the pre-synaptic spike 204 the post-pre post-synaptic spike 206), the following sub-steps may occur: (3a) resource state revert (decay/recovery), and (3b) saving of resource state. These sub-steps are represented in a step-wise manner in FIG. 3, wherein the x-axis represents a step, not time. Thus, the final step (3a) may incur decay (reverse recovery) of the resource.

Figures 3, 4:
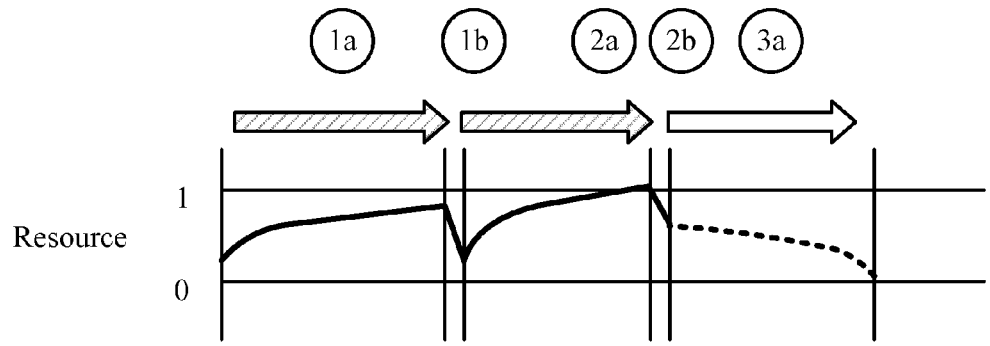
FIG. 3 illustrates an example of resource update during the combined LTP and LTD in accordance with certain aspects of the present disclosure.
FIG. 4 illustrates an example comparison of number of operations for different resource models in accordance with certain aspects of the present disclosure.

FIG. 4 illustrates an example 400 of comparison of number of operations for different resource models assuming exponents are computed using lookup tables (LUTs) in accordance with certain aspects of the present disclosure. Different resource models compared in FIG. 4 includes: (i) resource availability, (ii) lack of resource, (iii) log of resource availability, and (iv) negative log lack of resource. The number of operations are compared for performing synaptic plasticity, resource recovery and resource commitment, while using different resource models. It can be observed from FIG. 4 that the model based on negative log lack of resource provides the least number of operations among all considered resource models.

Figure 5:
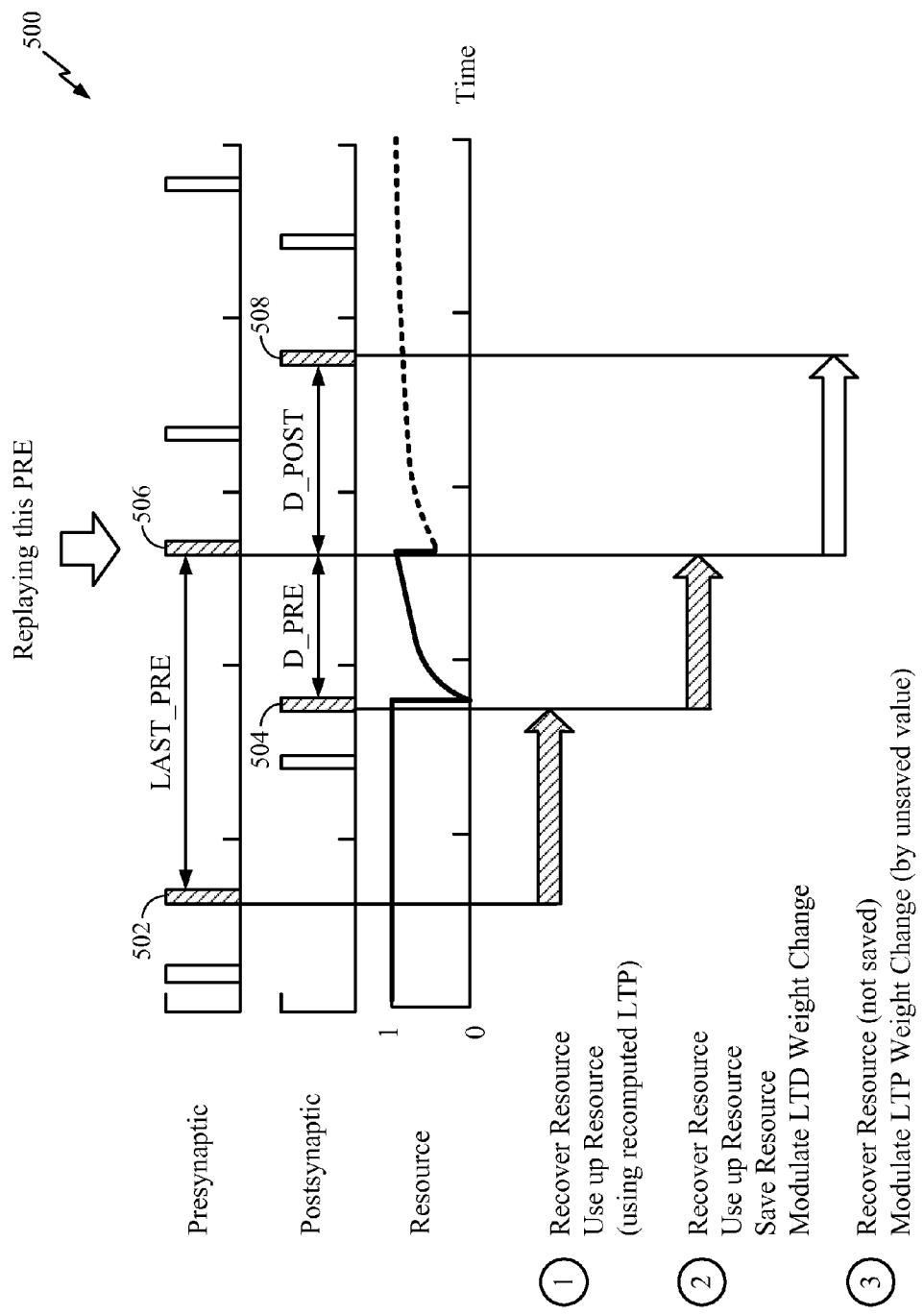
FIG. 5 illustrates another example of combined pre-synaptic replay rule handling both LTP and LTD in accordance with certain aspects of the present disclosure.

FIG. 5 illustrates an example 500 of combined pre-synaptic replay rule handling both LTP and LTD in accordance with certain aspects of the present disclosure. The resource method may need a time since the last (prior) pre-synaptic spike, which is effectively the time since the last execution of the rule for the synapse. The method may comprise saving the resource state at the time of the replayed spike. In an aspect, the resource state may be brought up to date in two steps. First, the resource state may be brought up to the pre-pre post time (recovery) and the resource depletion due to the pair of spikes (i.e., a last pre-synaptic spike 502, a pre-pre post-synaptic spike 504) is accounted for. It should be noted that this weight change may not be actually made. Second, the resource state may be brought up to the pre time (recovery) and the resource depletion due to the other pair of spikes (i.e., the pre-pre post-synaptic spike 504, a current pre-synaptic spike 506) is accounted for. In an aspect, this weight change (LTD) may be made for the pair of spikes (i.e., the current pre-synaptic spike 506, a post-pre post-synaptic spike 508). A third step may be required, but the resource state may not be saved. In this step, the resource state may be brought up to the post-pre post time (recovery), but may not be depleted by the LTP weight change (which is made).

In summary, referring to FIG. 5, the following sequence of steps may occur. In the first step (i.e., the last pre-synaptic spike 502→the pre-pre post-synaptic spike 504), the following sub-steps may occur: (1a) resource state update (recovery/decay), (1b) LTP weight change (not actually made), and (1c) resource state update (commitment/depletion). In the second step (i.e., the pre-pre post-synaptic spike 504→the pre-synaptic spike 506), the following sub-steps may occur: (2a) resource state update (recovery/decay), (2b) LTD weight change, (2c) resource state update (commitment/depletion), and (2d) saving of resource state. In the third step (i.e., the pre-synaptic spike 506→the post-pre post-synaptic spike 508), the following sub-steps may occur: (3a) resource state update (recovery/decay), (3b) LTP weight change, and (3c) saving of weight.

By applying the method of combining LTP and LTD into a single pre-synaptic rule illustrated in FIG. 5, it can be observed that the synaptic plasticity operation may be performed two times (i.e., LTD may be performed in the second step and LTP may be performed in the third step of the method from FIG. 5). Further, the resource recovery operation may be performed three times (i.e., once in each step of the method from FIG. 5), and the resource commitment operation may be performed two times (i.e., once in first and second steps of the method illustrated in FIG. 5). Further advantages may be obtained due to asymmetry, since resource recovery computations may be needed more often than resource commitment or plasticity computations.

In an aspect of the present disclosure, LTP and LTD can also be triggered and computed separately. In this case, LTP may be computed upon post-synaptic spike event (based on the nearest pre-post pairing, for example) and LTD may be computed upon pre-synaptic spike event (based on the nearest post-pre pairing, for example). This may be referred to as the standard LTP/LTD separate rule. It can be observed that in the case of standard LTP/LTD separate rule, the synaptic plasticity operation may be computed two times (once for LTP and once for LTD), the resource recovery operation may be computed two times (once for LTP and once for LTD), and the resource commitment operation may be computed two times (once for LTP and once for LTD).

Lookup Tables

As aforementioned, exponents in the synaptic resource models may be computed and stored in hardware using LUTs. The exponential LUT may be defined as:

$$g(x) = c_1 e^{-c_2 x + c_3} + c_4, \quad (42)$$

where the coefficients $c_1$, $c_2$, $c_3$ and $c_4$ may be stored in the LUT. For, $$y(x) = a_1 e^{-a_2 x + a_3} + a_4, \quad (43)$$

the exponential variable y(x) may be written as:

$$y(x) = \left(\frac{a_1}{c_1}\right)(c_1 e^{-a_x x + a_3} + c_4) + \left(a_4 - \frac{c_4}{c_1}\right), \quad (44)$$

$$y(x) = \left(\frac{a_1}{c_1}\right) g\left(\left(\frac{a_2}{c_2}\right) x - \left(\frac{a_3}{c_2} + \frac{c_3}{c_2}\right)\right) + \left(a_4 - \frac{c_4}{c_1}\right). \quad (45)$$

It may also be convenient to represent the difference of exponentials (either for STDP curves or for resource model computations, or both). The general form may be given as, $$g(x,y) = e^x - c_1 e^y. \quad (46)$$

Equivalently, $$g(x,y) = e^x - e^{c_2 + y} = e^x (1 - e^{c_2 + y - x}), \quad (47)$$

where $c_2 = \log c_1$. In the log domain, $$\log g(x,y) = \log g(x,z) = x + \log(1 - e^z), \quad (48)$$

where $z = y - c_2 - x$. Thus, only a table (LUT) for $\log(1 - e^z)$ is needed.

Further, by Taylor series expansion, $$\log g(x, z) = x - \sum_{n=1}^{\infty} \frac{e^{nz}}{n}. \quad (49)$$

If z is negative, which can be achieved by swapping x and y if necessary, the following approximation may hold, $$\log g(x,z) \approx x - e^z. \quad (50)$$

Selection of Spikes and Ordering

In the aforementioned alternatives for the synaptic resource model, only the nearest post-synaptic spikes to the current (replayed) pre-synaptic spike were considered for LTP and LTD. However, this may not be necessary. In general, all or any other subset of post-synaptic spikes may be considered. Also, it was assumed in the aforementioned alternatives that all pre-synaptic spikes were replayed. This also may not be necessary. Any subset of pre-synaptic spikes may be replayed, such as only those that occur at a particular interval of time.

In addition, the update rules are described in a LTD-then-LTP order. This is also not a strict requirement as the opposite may also be performed (i.e., LTP-then-LTD). In one aspect, this may be done by replaying post-synaptic instead of pre-synaptic spikes. In another aspect, it may be sufficient to simply look further forward or further backward in time relative to the replay.

Probabilistic Methods and Bit-Widths

In the aforementioned aspects, a particular fixed-point value for resource (or resource representation alternative) can be considered. In addition, floating point precision can also be used. However, moving in the opposite direction, fewer bits (or even only one bit) may be utilized for resource representation. In an aspect of the present disclosure, this approach may be then combined with a probabilistic approach to account for the resource. For example, in the case of one-bit precision, since the resource stored value can take on only two values (0 or 1), flipping state (1→0 for resource depletion or 0→1 for resource recovery) can be made on the basis of chance so that in the long-term or aggregate sense the resource accounting resembles that of having a larger resolution.

In one aspect of the present disclosure, this may be achieved with a random or pseudo-random number generator to which the resource-modulating factor (such as weight change amount) may be added. The result may be then subject to a threshold. For example, if the threshold is exceeded, the bit may be flipped. Otherwise, the bit may not be flipped. Thus, if the modulating factor is large, it is more likely to produce the effect. This operation can be applied to resource recovery, resource use and synaptic weight change.

Projections

Figure 6:
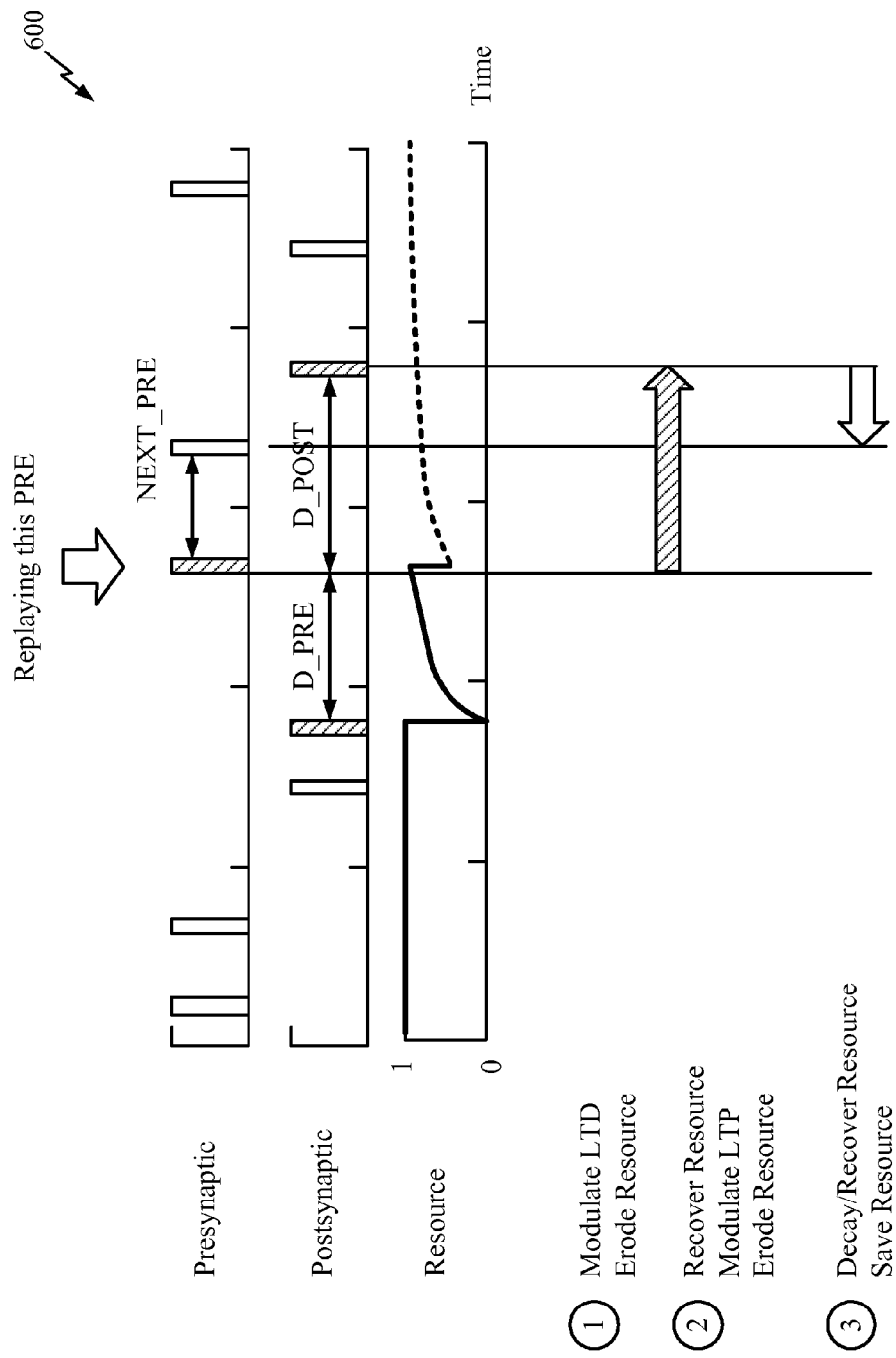
FIG. 6 illustrates another example of combined pre-synaptic replay rule handling both LTP and LTD in accordance with certain aspects of the present disclosure.

In the first alternative method for synaptic rules illustrated in FIG. 2, the resource value may be projected back in time to the pre-synaptic spike replay time. However, there are additional alternative possibilities, such as the one illustrated in an example 600 in FIG. 6. First, instead of projecting the replay time backward or forward, the time of applicability of the resource state may be stored. Upon the next step, resource recovery may then be computed based on that time. Second, the resource may be projected into the future to the next pre-synaptic spike, and thus the resource may be ready for the next replay. This may require knowledge of the next pre-synaptic spike time.

However, this approach may be practical since replay would generally occur substantially later than the actual spike so that subsequent post-synaptic spikes are available for LTP computation. Thus, the future pre-synaptic spike time may be known (it may be either before or after the nearest post-synaptic spike following the replayed pre-synaptic spike). Moreover, if it is far in the future and unknown, this merely means the resource recovery would likely be complete anyway and thus it may not need to be known. This particular alternative may actually be more efficient because only two recoveries may be needed. In addition, this may change which resource representation alternative is the preferred one.

Figure 7:
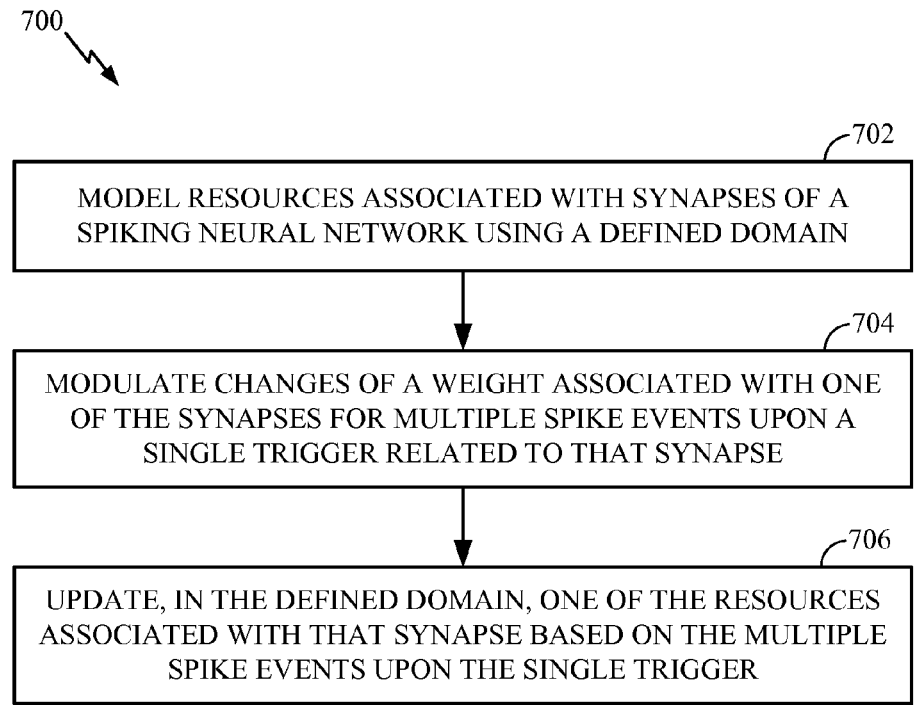
FIG. 7 illustrates example operations of neural learning in accordance with certain aspects of the present disclosure.

FIG. 7 illustrates example operations 700 of learning in a spiking neural network in accordance with certain aspects of the present disclosure. At 702, resources associated with synapses of the spiking neural network may be modeled using a defined domain. At 704, changes of a weight associated with one of the synapses may be modulated for multiple spike events upon a single trigger related to that synapse. At 706, one of the resources associated with that synapse may be updated in the defined domain based on the multiple spike events upon the single trigger.

In an aspect of the present disclosure, the defined domain may be represented with negative log lack-of resource availability. In another aspect, the defined domain may be represented with lack of resource availability or with log of resource availability.

In an aspect of the present disclosure, modulating the changes of the weight may comprise modulating a long-term depression (LTD) change of the weight, and modulating a long-term potentiation (LTP) change of the weight. In an aspect, updating that one resource may comprise recovering that one resource prior to modulating the LTD change of weight, and recovering that one resource prior to modulating the LTP change of weight. In another aspect, updating that one resource may comprise eroding that one resource following modulating the LTD change of weight, and eroding that one resource following modulating the LTP change of weight. Further, a state of the resource may be saved in the defined domain after performing both the LTD change of weight and the LTP change of weight.

In an aspect of the present disclosure, that one resource may be projected back in time to a replay time of a pre-synaptic spike of the multiple spike events. Further, projecting that one resource may comprise projecting decay of that one resource back in time.

Figure 8:
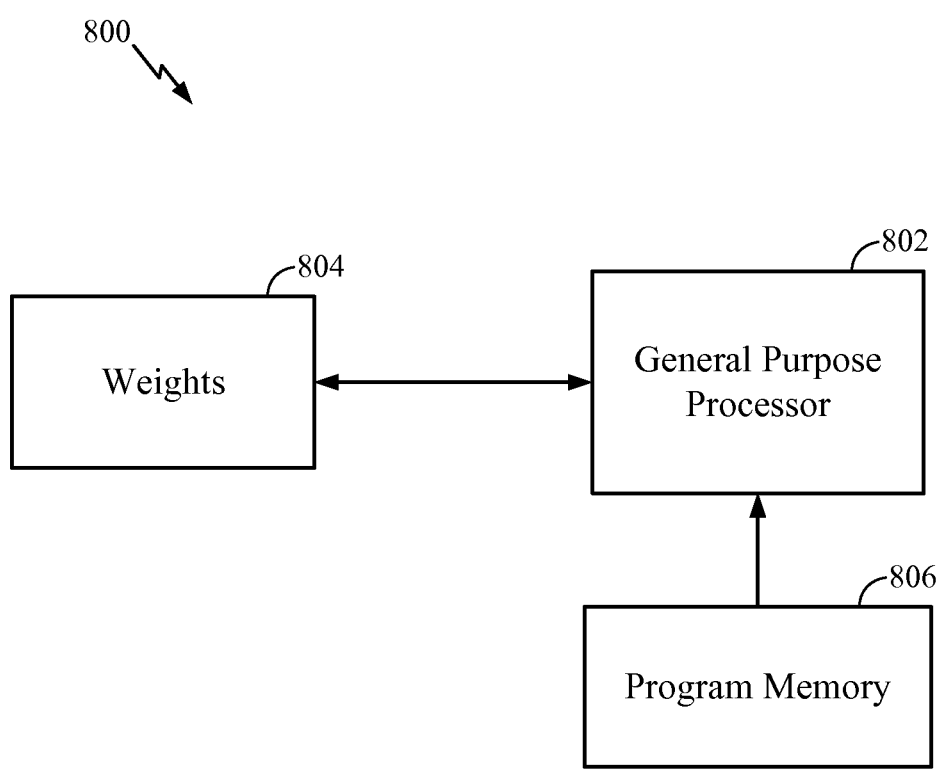
FIG. 8 illustrates an example software implementation of neural learning using a general-purpose processor in accordance with certain aspects of the present disclosure.

FIG. 8 illustrates an example software implementation 800 of the aforementioned method for neural learning in a spiking neural network using a general-purpose processor 802 in accordance with certain aspects of the present disclosure. Weights associated with each connection (synapse) of a computational network (neural network) may be stored in a memory block 804, while instructions related to the neural learning being executed at the general-purpose processor 802 may be loaded from a program memory 806. In an aspect of the present disclosure, the instructions loaded into the general-purpose processor 802 may comprise code for modeling resources associated with synapses of the spiking neural network using a defined domain, code for modulating changes of a weight associated with one of the synapses for multiple spike events upon a single trigger related to that synapse, and code for updating, in the defined domain, one of the resources associated with that synapse based on the multiple spike events upon the single trigger.

Figure 9:
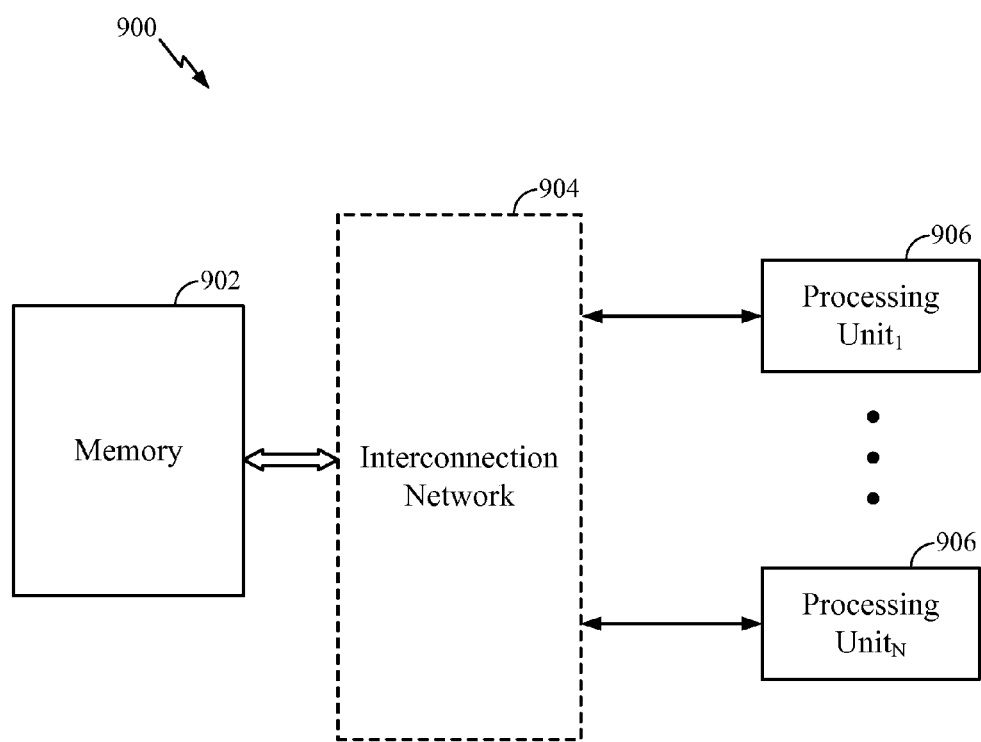
FIG. 9 illustrates an example implementation of neural learning where a memory may be interfaced with individual distributed processing units in accordance with certain aspects of the present disclosure.

FIG. 9 illustrates an example implementation 900 of the aforementioned method for neural learning in a spiking neural network where a memory 902 can be interfaced via an interconnection network 904 with individual (distributed) processing units (neural processors) 906 of a computational network (neural network) in accordance with certain aspects of the present disclosure. One or more weights associated with one or more connections (synapses) of the computational network (neural network) may be loaded from the memory 902 via connection(s) of the interconnection network 904 into each processing unit (neural processor) 906. In an aspect of the present disclosure, the processing unit 906 may be configured to model resources associated with synapses of the spiking neural network using a defined domain, modulate changes of a weight associated with one of the synapses for multiple spike events upon a single trigger related to that synapse, and update, in the defined domain, one of the resources associated with that synapse based on the multiple spike events upon the single trigger.

Figure 10:
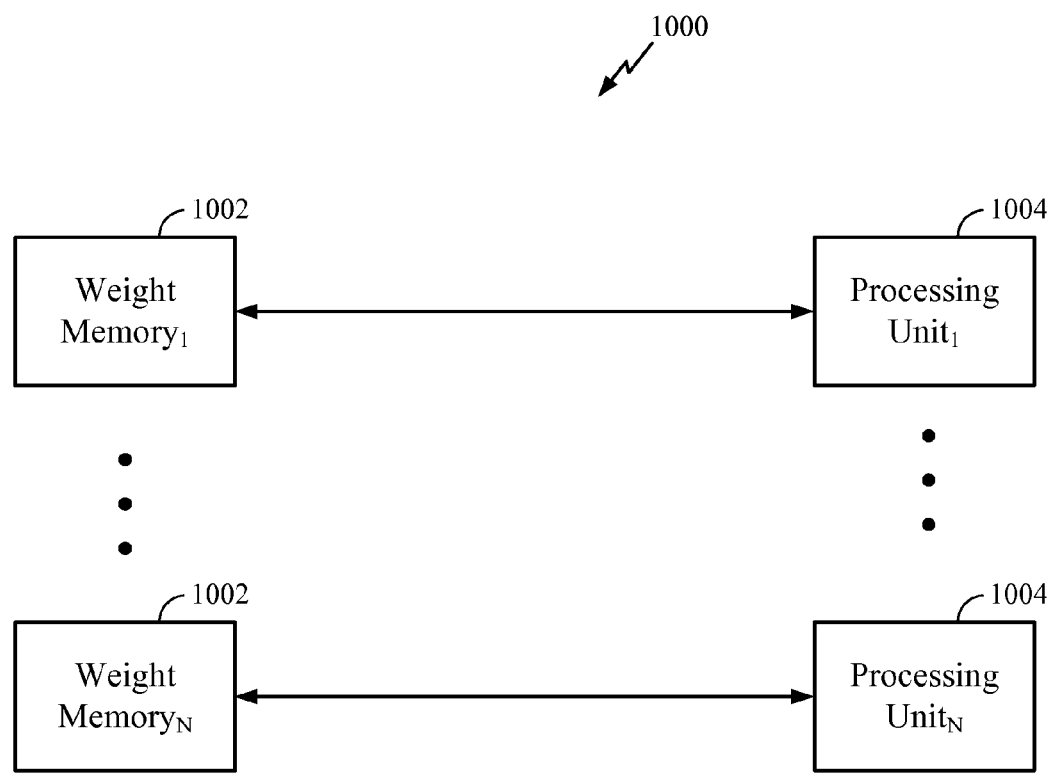
FIG. 10 illustrates an example implementation of neural learning based on distributed memories and distributed processing units in accordance with certain aspects of the present disclosure.

FIG. 10 illustrates an example implementation 1000 of the aforementioned method for neural learning in a spiking neural network based on distributed weight memories 1002 and distributed processing units (neural processors) 1004 in accordance with certain aspects of the present disclosure. As illustrated in FIG. 10, one memory bank 1002 may be directly interfaced with one processing unit 1004 of a computational network (neural network), wherein that memory bank 1002 may store one or more weights of one or more connections (synapses) associated with that processing unit (neural processor) 1004. In an aspect of the present disclosure, the processing unit 1004 may be configured to model resources associated with synapses of the spiking neural network using a defined domain, modulate changes of a weight associated with one of the synapses for multiple spike events upon a single trigger related to that synapse, and update, in the defined domain, one of the resources associated with that synapse based on the multiple spike events upon the single trigger.

Figure 7A:
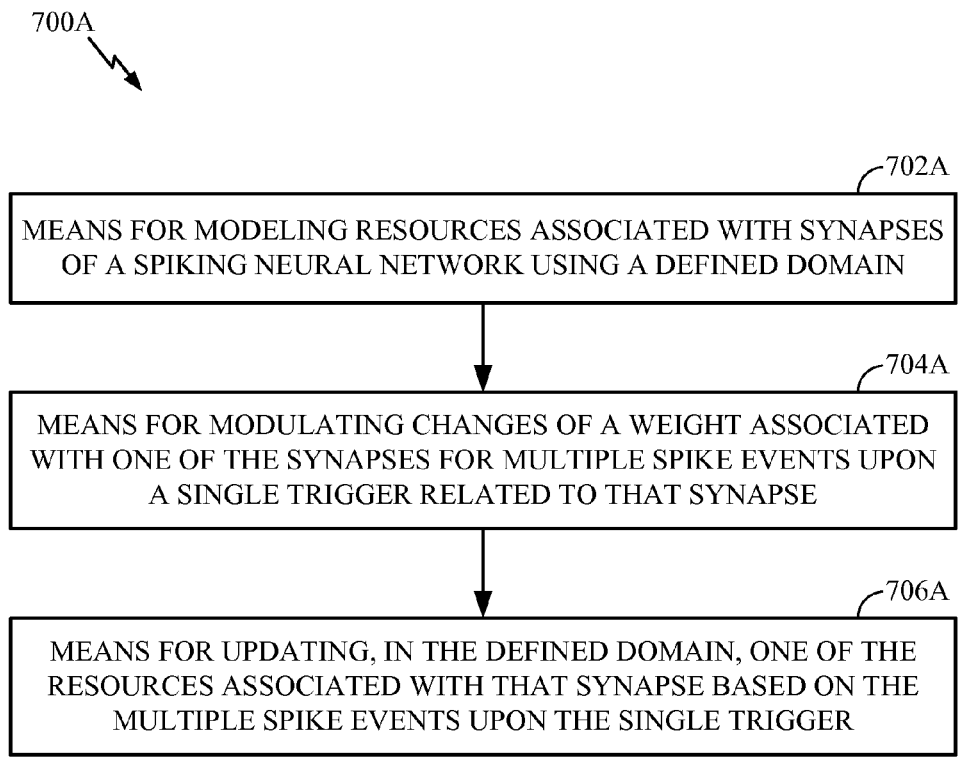
FIG. 7A illustrates example components capable of performing the operations illustrated in FIG. 7.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 700 illustrated in FIG. 7 correspond to components 700A illustrated in FIG. 7A.

For example, the means for eroding may comprise an application specific integrated circuit, e.g., the general-purpose processor 802 from FIG. 8, the processing unit 906 from FIG. 9, or the processing unit 1004 from FIG. 10. The means for modulating may comprise an application specific integrated circuit, e.g., the general-purpose processor 802, the processing unit 906, or the processing unit 1004. The means for recovering may comprise an application specific integrated circuit, e.g., the general-purpose processor 802, the processing unit 906, or the processing unit 1004. The means for saving may comprise an application specific integrated circuit, e.g., the program memory 806 from FIG. 8, the memory 902 from FIG. 9, the memory 1002 from FIG. 10, the general-purpose processor 802, the processing unit 906, or the processing unit 1004. The means for projecting may comprise an application specific integrated circuit, e.g., the general-purpose processor 802, the processing unit 906, or the processing unit 1004. The means for projecting decay of a synaptic resource may comprise an application specific integrated circuit, e.g., the general-purpose processor 802, the processing unit 906, or the processing unit 1004.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of learning in a spiking neural network, comprising:

modeling resources associated with synapses of the spiking neural network using a defined domain;

modulating changes of a weight associated with one of the synapses for multiple spike events upon a single trigger related to that synapse; and updating, in the defined domain, one of the resources associated with that synapse based on the multiple spike events upon the single trigger.

2. The method of claim 1, wherein the defined domain is represented with negative log lack-of resource availability.

3. The method of claim 1, wherein the defined domain is represented with lack of resource availability or with log of resource availability.

4. The method of claim 1, wherein modulating the changes of the weight comprises:

modulating a long-term depression (LTD) change of the weight; and modulating a long-term potentiation (LTP) change of the weight.

5. The method of claim 4, wherein updating that one resource comprises:

recovering that one resource prior to modulating the LTD change of weight; and recovering that one resource prior to modulating the LTP change of weight.

6. The method of claim 4, wherein updating that one resource comprises:

eroding that one resource following modulating the LTD change of weight; and eroding that one resource following modulating the LTP change of weight.

7. The method of claim 4, further comprising:

saving a state of that one resource in the defined domain after performing both the LTD change of weight and the LTP change of weight.

8. The method of claim 1, further comprising:
projecting that one resource back in time to a replay time of a pre-synaptic spike of the multiple spike events.

9. The method of claim 8, wherein projecting that one resource comprises:
projecting decay of that one resource back in time.

10. An apparatus for learning in a spiking neural network, comprising:
a first circuit configured to model resources associated with synapses of the spiking neural network using a defined domain;
a second circuit configured to modulate changes of a weight associated with one of the synapses for multiple spike events upon a single trigger related to that synapse; and
a third circuit configured to update, in the defined domain, one of the resources associated with that synapse based on the multiple spike events upon the single trigger.

11. The apparatus of claim 10, wherein the defined domain is represented with negative log lack-of resource availability.

12. The apparatus of claim 10, wherein the defined domain is represented with lack of resource availability or with log of resource availability.

13. The apparatus of claim 10, wherein the second circuit is configured to modulate changes of the weight by:
modulating a long-term depression (LTD) change of the weight; and
modulating a long-term potentiation (LTP) change of the weight.

14. The apparatus of claim 13, wherein the third circuit is configured to update that one resource by:
recovering that one resource prior to modulating the LTD change of weight; and
recovering that one resource prior to modulating the LTP change of weight.

15. The apparatus of claim 13, wherein the third circuit is configured to update that one resource by:
eroding that one resource following modulating the LTD change of weight; and
eroding that one resource following modulating the LTP change of weight.

16. The apparatus of claim 13, further comprising:
a fourth circuit configured to save a state of that one resource in the defined domain after performing both the LTD change of weight and the LTP change of weight.

17. The apparatus of claim 10, further comprising:
a fourth circuit configured to project that one resource back in time to a replay time of a pre-synaptic spike of the multiple spike events.

18. The apparatus of claim 17, wherein projecting that one resource comprises:
projecting decay of that one resource back in time.

19. An apparatus for learning in a spiking neural network, comprising:
means for modeling resources associated with synapses of the spiking neural network using a defined domain;
means for modulating changes of a weight associated with one of the synapses for multiple spike events upon a single trigger related to that synapse; and
means for updating, in the defined domain, one of the resources associated with that synapse based on the multiple spike events upon the single trigger.

20. The apparatus of claim 19, wherein the defined domain is represented with negative log lack-of resource availability.

21. The apparatus of claim 19, wherein the defined domain is represented with lack of resource availability or with log of resource availability.

22. The apparatus of claim 19, further comprising:
means for modulating a long-term depression (LTD) change of the weight; and
means for modulating a long-term potentiation (LTP) change of the weight.

23. The apparatus of claim 22, further comprising:
means for recovering that one resource prior to modulating the LTD change of weight; and
means for recovering that one resource prior to modulating the LTP change of weight.

24. The apparatus of claim 22, further comprising:
means for eroding that one resource following modulating the LTD change of weight; and
means for eroding that one resource following modulating the LTP change of weight.

25. The apparatus of claim 22, further comprising:
means for saving a state of that one resource in the defined domain after performing both the LTD change of weight and the LTP change of weight.

26. The apparatus of claim 19, further comprising:
means for projecting that one resource back in time to a replay time of a pre-synaptic spike of the multiple spike events.

27. The method of claim 26, wherein the means for projecting that one resource comprises:
means for projecting decay of that one resource back in time.

28. A computer program product for learning in a spiking neural network, comprising a computer-readable medium comprising code for:
modeling resources associated with synapses of the spiking neural network using a defined domain;
modulating changes of a weight associated with one of the synapses for multiple spike events upon a single trigger related to that synapse; and
updating, in the defined domain, one of the resources associated with that synapse based on the multiple spike events upon the single trigger.

29. The computer program product of claim 28, wherein the defined domain is represented with negative log lack-of resource availability.

30. The computer program product of claim 28, wherein the defined domain is represented with lack of resource availability or with log of resource availability.

31. The computer program product of claim 28, wherein the computer-readable medium further comprising code for:
modulating a long-term depression (LTD) change of the weight; and
modulating a long-term potentiation (LTP) change of the weight.

32. The computer program product of claim 31, wherein the computer-readable medium further comprising code for:
recovering that one resource prior to modulating the LTD change of weight; and
recovering that one resource prior to modulating the LTP change of weight.

33. The computer program product of claim 31, wherein the computer-readable medium further comprising code for:
eroding that one resource following modulating the LTD change of weight; and
eroding that one resource following modulating the LTP change of weight.

34. The computer program product of claim 31, wherein the computer-readable medium further comprising code for:
saving a state of that one resource in the defined domain after performing both the LTD change of weight and the LTP change of weight.

35. The computer program product of claim 28, wherein the computer-readable medium further comprising code for:
   projecting that one resource back in time to a replay time of a pre-synaptic spike of the multiple spike events.

36. The computer program product of claim 35, wherein the computer-readable medium further comprising code for:
   projecting decay of that one resource back in time.

* * * * *